United States Patent [19]

Mark

[11] Patent Number: 4,477,632

[45] Date of Patent: Oct. 16, 1984

[54] FLAME RETARDANT COPOLYESTER-CARBONATE COMPOSITIONS

[75] Inventor: Victor Mark, Evansville, Ind.

[73] Assignee: General Electric Company, Mt. Vernon, Ind.

[21] Appl. No.: 519,485

[22] Filed: Aug. 1, 1983

[51] Int. Cl.$^3$ .................... C08L 67/02; C08L 69/00
[52] U.S. Cl. ........................... 525/147; 525/439
[58] Field of Search ............... 525/146, 147, 439; 528/204

[56] References Cited

U.S. PATENT DOCUMENTS

| | | | |
|---|---|---|---|
| 3,169,121 | 2/1965 | Goldberg | 525/176 |
| 3,673,278 | 6/1972 | Bialous | 525/147 |
| 4,223,100 | 9/1980 | Reinert | 525/146 |
| 4,252,916 | 2/1981 | Mark | 525/146 |
| 4,366,276 | 12/1982 | Freitag | 525/146 |

Primary Examiner—John C. Bleutge
Assistant Examiner—Patricia Short
Attorney, Agent, or Firm—Myron B. Kapustij; Martin B. Barancik

[57] ABSTRACT

Flame retardant and non dripping copolyester-carbonate compositions comprised of, in admixture:
(i) a fluorinated polyolefin; and
(ii) at least one halogen-free sulfur-containing copolyester-carbonate resin derived from (a) a carbonate precursor, (b) at least one halogen-free, sulfur-free and non-polycyclic dihydric phenol, (c) at least one halogen-free thiodiphenol, and (d) at least one difunctional carboxylic acid or a reactive derivative thereof.

19 Claims, No Drawings

FLAME RETARDANT COPOLYESTER-CARBONATE COMPOSITIONS

BACKGROUND OF THE INVENTION

Copolyester-carbonates are a class of thermoplastics that, due to their many excellent properties, are utilized in many commercial and industrial applications as engineering thermoplastics. They are members of the tough thermoplastic family and exhibit excellent properties of toughness, flexibility, high heat distortion temperatures, and the like. These copolyester-carbonates may be prepared, as disclosed in U.S. Pat. No. 3,169,121, by the coreaction of a carbonate precursor, a dihydric phenol, and a difunctional carboxylic acid.

However, these copolyester-carbonates suffer from the disadvantage that they are somewhat flammable. Thus, copolyester-carbonates are sometimes unsuitable for certain applications where high temperature and/or exposure to flame may be encountered. In order to render the copolyester-carbonates suitable for high temperature and/or open flame environments they must first be modified to be rendered flame retardant. This modification involves either adding certain additives to the copolyester-carbonate resins or incorporating certain moieties, such as halogen containing moieties, into the copolyester-carbonate polymer itself. However, the presence of these flame retardant additives or halogen containing moieties may sometimes have a deleterious affect on the advantageous physical properties of the copolyester-carbonates, such as for example the impact strength.

It would thus be very advantageous if compositions comprised of halogen-free copolyester carbonate resins could be provided which exhibit flame retardant and non-dripping properties, which are economically competitive with non-flame retardant copolyester-carbonate compositions, and which simultaneously exhibit, to a substantial degree, most of the advantageous physical properties of unmodified copolyester-carbonate compositions such as good impact strength.

It is, therefore, an object of the instant invention to provide copolyester-carbonate resin compositions which are flame retardant, non-dripping, are economically competitive with non-flame retardant copolyester-carbonate compositions, and which simultaneously exhibit, to a substantial degree, substantially most of the advantageous physical properties of unmodified copolyester-carbonate resins.

SUMMARY OF THE INVENTION

Copolyester-carbonate compositions are provided which exhibit to a substantial degree most of the advantageous properties of unmodified copolyester-carbonate resins and which are simultaneously fire retardant and non-dripping. These compositions are comprised of, in admixture:

(i) a minor amount of a fluorinated polyolefin; and
(ii) at least one halogen-free copolyester-carbonate resin derived from (a) a carbonate precursor, (b) at least one difunctional carboxylic acid or a reactive derivative thereof, (c) at least one halogen-free, sulfur-free and non-polycyclic dihydric phenol, and (d) at least one halogen-free thiodiphenol.

DESCRIPTION OF THE INVENTION

It has surprisingly been discovered that copolyester-carbonate compositions containing a halogen-free copolyester-carbonate resin can be provided which are fire retardant, non-dripping, and exhibit, to a substantial degree, most of the advantageous physical properties of unmodified copolyester-carbonate resins. The instant compositions are comprised of, in admixture, of:

(i) a minor amount of a fluorinated polyolefin; and
(ii) a copolyester-carbonate resin derived from (a) a carbonate precursor, (b) at least one difunctional carboxylic acid or a reactive derivative thereof, (c) at least one halogen free and sulfur free non polycyclic dihydric phenol, and (d) at least one halogen-free thiodiphenol.

The fluorinated polyolefins used in this invention as drip retarding and flame retardance enhancing agents are commercially available or may readily be prepared by known processes. They are solids obtained by the polymerization of tetrafluoroethylene, for example, in aqueous media with free radical catalysts, e.g. sodium, potassium or ammonium peroxydisulfides at 100 to 1,000 psi at 0°–200° C., and preferably at 20°–100° C. The preparation of some of these fluorinated polyolefins is disclosed in U.S. Pat. No. 2,393,967, which is hereby incorporated herein by reference. While not essential, it is preferred to use these fluorinated polyolefin resins in the form of relatively large particles, e.g. of average particle size of from about 0.3 to about 0.7 mm, mostly about 0.5 mm. These are generally better than the usual polytetrafluoroethylene powders which have particles of from about 0.05 to about 0.5 millimicrons in diameter. It is especially preferred to use the relatively large particle size material because it tends to disperse readily in the polymers and bond them together into fibrous material. Such preferred polytetrafluoroethylenes are designated by ASTM as Type 3, and are available commercially from the E. I. duPont de Nemours & Company under the tradename TEFLON type 6.

The instant compositions contain an amount of fluorinated polyolefin which when admixed with the sulfur containing but halogen free copolyester-carbonate resin is effective to enhance the flame retardancy of said compositions and to render said compositions non-dripping. Generally, this is a relatively minor amount and is generally in the range of from about 0.01 to about 1 weight percent, based on the amount of the copolyester-carbonate resin present, and preferably from about 0.01 to about 0.5 weight percent.

Briefly stated, the high molecular weight aromatic copolyester-carbonate resins utilized in the instant invention comprise recurring carbonate groups

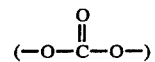

carboxylate groups

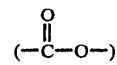

and aromatic carbocyclic groups in the linear polymer chain, in which at least some of the carbonate groups and at least some of the carboxylate groups are bonded directly to the ring carbon atoms of the aromatic carbocyclic groups.

These copolyester-carbonate polymers contain ester bonds and carbonate bonds in the polymer chain, wherein the amount of the ester bonds is from about 25 to about 90 mole percent, preferably from about 35 to about 80 mole percent, relative to the carbonate bonds. For example, 5 moles of bisphenol-A reacting completely with 4 moles of isophthaloyl dichloride and 1 mole of phosgene would give a copolyester-carbonate of 80 mole percent ester bonds.

The halogen free, sulfur free and non polycylic dihydric phenols employed in the production of the instant copolyester-carbonate resins, which resins are halogen free, may be represented by the general formula

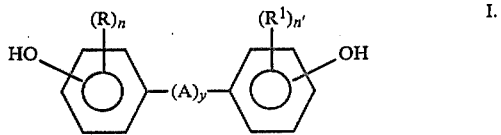

wherein:

A is selected from divalent non cyclic or mono cyclic hydrocarbon radicals, preferably those containing from 1 to about 20 carbon atoms, the —O— radical, and the

radical;

R is independently selected from monovalent hydrocarbon radicals, preferably those containing from 1 to about 15 carbon atoms;

$R^1$ is independently selected from monovalent hydrocarbon radicals, preferably those containing from 1 to about 15 carbon atoms;

n and n' are independently selected from whole numbers having a value of from 0 to 4 inclusive; and y is either zero or one.

The divalent hydrocarbon radicals represented by A include alkylene radicals, alkylidene radicals, cycloalkylene radicals, and cycloalkylidene radicals.

Some illustrative non-limiting examples of alkylene and alkylidene groups represented by A include methylene, ethylene, propylene, propylidene, isopropylidene, butylene, isobutylene, butylidene, amylene, isoamylene, amylidene, isoamylidene, and the like.

When A represents a cycloalkylene or cycloalkylidene radical it is preferred that these cycloalkylene and cycloalkylidene radicals contain from 4 to about 8 carbon atoms in the cyclic structure. These preferred cycloalkylene and cycloalkylidene groups may be represented by the general formula

wherein:

Cy is selected from cycloalkylene and cycloalkylidene radicals containing from 4 to about 8 carbon atoms in the cyclic structure;

$R^2$ is independently selected from lower alkyl radicals, preferably those lower alkyl radicals containing from 1 to about 5 carbon atoms; and b is a whole number having a value of from 0 up to the number of replaceable hydrogen atoms present on Cy, preferably b has a value of from 0 to 4 inclusive.

Some non-limiting illustrative cycloalkylene and cycloalkylidene radicals represented by Formula II include cyclopentylene, cyclohexylene, cyclohexylidene, methylcyclohexylene, methylcyclohexylidene, dimethylcyclohexylidene, cyclooctylene, cyclooctylidene, and the like.

The monovalent hydrocarbon radicals represented by R and $R^1$ include alkyl radicals, aryl radicals, aralkyl radicals, and alkaryl radicals.

Preferred alkyl radicals are those containing from 1 to about 10 carbon atoms. Illustrative of these preferred alkyl radicals are methyl, ethyl, propyl, isopropyl, butyl, isobutyl, tertiarybutyl, pentyl, neopentyl, hexyl, and the like.

Preferred aryl radicals represented by R and $R^1$ are those containing from 6 to 12 carbon atoms, i.e., phenyl and naphthyl.

Preferred alkaryl and aralkyl radicals represented by R and $R^1$ are those containing from 7 to about 15 carbon atoms.

Preferably R and $R^1$ are independently selected from alkyl radicals.

In the dihydric phenol compounds represented by Formula I above R and $R^1$ may be the same or they may be different. When more than one R substituent is present they may be the same or different. The same is true for the $R^1$ substituent. Where y is zero in Formula I the aromatic rings are directly joined with no intervening alkylene or other bridge. The positions of hydroxyl groups and R and $R^1$ on the aromatic nuclear residues can be varied in the ortho, meta or para positions and the groups can be in a vicinal, asymmetrical or symmetrical relationship where two or more aromatic ring carbon atoms are substituted with R or $R^1$ and hydroxyl group.

The term "non polycyclic" as used herein with respect to the instant dihydric phenols of Formula I is meant to specify that the divalent aliphatic hydrocarbon radicals bridging the two aromatic nuclear residues of the dihydric phenol of Formula I, i.e. A and Cy, are non-polycyclic. That is to say, they are selected from non-cyclic aliphatic radicals such as alkylene or alkylidene radicals, or monocyclic aliphatic radicals such as cyclohexylene or cyclohexylidene radicals. Thus, the non polycyclic dihydric phenols of Formula I do not include, by definition, those polycyclic dihydric phenols wherein the bridging group connecting the two aromatic residues is polycyclic, e.g., a bicyclic, bridged, or fused hydrocarbon multi ring structure such as the 2-norbornylidene or bicyclo(3,3,0)octylene rings.

Some illustrative non limiting examples of the halogen free, sulfur free and non polycyclic dihydric phenols of Formula I include:
2,2-bis(4-hydroxyphenyl)propane (bisphenol-A);
2,4'-dihydroxydiphenylmethane;
bis(2-hydroxyphenyl)methane;
bis(4-hydroxyphenyl)methane;
1,1-bis(4-hydroxyphenyl)ethane;
1,3-bis(3-methyl-4-hydroxyphenyl)propane;
2,2-bis(3-isopropyl-4-hydroxyphenyl)propane;
bis(4-hydroxyphenyl)cyclohexylmethane;
1,1-bis(4-hydroxyphenyl)cyclohexane;
bis(3-ethyl-4-hydroxyphenyl)ether;
bis(4-hydroxyphenyl)ether;
2,2-bis(3,5-dimethyl-4-hydroxyphenyl)propane;
3,3'-dimethyl-4,4'-dihydroxydiphenyl;
p,p'-dihydroxydiphenyl; and the like.

It is, of course, possible to employ mixtures of two or more different dihydric phenols of Formula I, as well as individual dihydric phenols, in the practice of the instant invention. Therefore, whenever the term dihydric phenol is used herein it is to be understood that this term encompasses mixtures of dihydric phenols as well as individual dihydric phenols.

The halogen-free thiodiphenols useful in the practice of this invention are those represented by the general formula

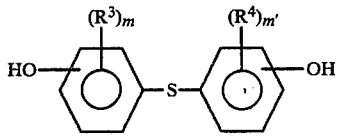

III.

wherein:

$R^3$ is independently selected from monovalent hydrocarbon radicals, preferably those monovalent hydrocarbon radicals containing from 1 to about 12 carbon atoms;

$R^4$ is independently selected from monovalent hydrocarbon radicals, preferably those containing from 1 to about 12 carbon atoms; and m and m′ are independently selected from whole numbers having a value of from 0 to 4 inclusive.

The monovalent hydrocarbon radicals represented by $R^3$ and $R^4$ are selected from alkyl, aryl, aralkyl, and alkaryl radicals.

The alkyl radicals represented by $R^3$ and $R^4$ are those containing from 1 to about 8 carbon atoms.

Preferred aryl radicals represented by $R^3$ and $R^4$ are those containing from 6 to 12 carbon atoms, i.e., phenyl and naphthyl.

Preferred aralkyl and alkaryl radicals represented by $R^3$ and $R^4$ are those containing from 7 to about 15 carbon atoms.

Preferred thiodiphenols of Formula III are those wherein $R^3$ and $R^4$ independently represent alkyl radicals.

In the thiodiphenol compounds of Formula III $R^3$ and $R^4$ may be the same or different. When more than one $R^3$ substituent is present they may be the same or different. The same is true for the $R^4$ substituents. The positions of the hydroxyl groups and $R^3$ or $R^4$ on the aromatic nuclear residues may be varied in the ortho, meta, and para positions and the groupings may be in a vicinal, asymmetrical or symmetrical relationship, where two or more ring carbon atoms of the aromatic hydrocarbon residues are substituted with $R^3$ or $R^4$ and hydroxyl groups.

Some illustrative non-limiting examples of the thiodiphenols of Formula III include:
4,4′-thiodiphenol;
2-methyl-4,4′-thiodiphenol;
2,2′-di-tertiary-butyl-4,4′-thiodiphenol;
2,2′-dimethyl-4,4′-thiodiphenol; and the like.
These thiodiphenols can be prepared by known methods such as those disclosed in U.S. Pat. No. 3,931,335, which is hereby incorporated herein by reference.

It is, of course, possible to employ mixtures of two or more different thiodiphenols of Formula III in the practice of the instant invention. Therefore, wherever the term thiodiphenol is used herein it is to be understood that this term includes mixtures of two or more different thiodiphenols as well as individual thiodiphenols.

The amount of thiodiphenol of Formula III employed is an amount effective, when combined with the fluorinated polyolefin, to render the instant compositions flame retardant and non-dripping. Generally, this amount is in the range of from about 1 to about 15 mole percent, based on the total amount of dihydric phenol of Formula I and thiodiphenol employed, preferably from about 1 to 10 mole %.

The carbonate precursor may be a carbonyl halide, a bishaloformate, or a diarylcarbonate. The carbonyl halides include carbonyl bromide, carbonyl chloride, and mixtures thereof. The bishaloformates include the bishaloformates of dihydric phenols such as bischloroformates of 2,2-bis(4-hydroxyphenyl)propane, hydroquinone, and the like; or the bishaloformates of glycols such as the bischloroformates of ethylene glycol, neopentyl glycol, polyethylene glycol, and the like. Typical of the diarylcarbonates which may be employed are diphenyl carbonate, and the di(alkylphenyl)carbonates such as di(tolyl)carbonate. Some other non-limiting illustrative examples of suitable diarylcarbonates include di(naphthyl)carbonate, phenyl tolyl carbonate, and the like.

The preferred carbonate precursors are the carbonyl halides, with carbonyl chloride, also known as phosgene, being the preferred carbonyl halide.

In general, any difunctional carboxylic acid conventionally used in the preparation of linear polyesters may be utilized in the preparation of the copolyester-carbonate resins of the instant invention. Generally, the carboxylic acids which may be used include the aliphatic carboxylic acids, the aromatic carboxylic acids, and aliphatic-aromatic carboxylic acids. These acids are disclosed in U.S. Pat. No. 3,169,121, which is hereby incorporated herein by reference.

The difunctional carboxylic acids which may be used generally will conform to the general formula

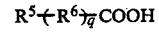

IV.

wherein $R^6$ is an alkylene, alkylidene or cycloaliphatic group; an alkylene, alkylidene or cycloaliphatic group containing ethylenic unsaturation; an aromatic group such as phenylene, biphenylene, substituted phenylene, and the like; two or more aromatic groups connected through non-aromatic linkages such as alkylene or alkylidene groups; and a divalent aralkyl radical such as tolylene, xylylene, and the like. $R^5$ is either a carboxyl or a hydroxyl group. The letter q represents one where $R^5$ is a hydroxyl group and either zero or one where $R^5$ is a carboxyl group.

Preferred difunctional carboxylic acids are the aromatic difunctional carboxylic acids, i.e., those acids of Formula IV wherein $R^6$ represents an aromatic radicals and q is one. The preferred aromatic difunctional carboxylic acids are those represented by the general formula

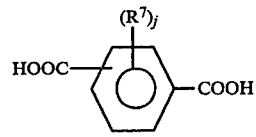

IV.

wherein j is a whole number having a value of from 0 to 4 inclusive; and $R^7$ is independently selected from alkyl groups.

Mixtures of these difunctional carboxylic acids may be employed and where difunctional carboxylic acid is mentioned herein, mixtures of such acids are considered to be encompassed thereby.

Preferred aromatic carboxylic acids are isophthalic acid, terephthalic acid, and mixtures thereof. A particularly useful aromatic difunctional carboxylic acid comprises a mixture of isophthalic acid and terephthalic acid wherein the weight ratio of terephthalic acid to isophthalic acid is in the range of from about 1:10 to about 0.2:9.8.

Rather than utilizing the difunctional carboxylic acid per se, it is possible to employ the reactive derivatives of said acid. Illustrative of these reactive derivatives are the acid halides. The preferred acid halides are the acid dichlorides and the acid dibromides. Thus, for example, instead of using terephthalic acid or isophthalic acid, terephthaloyl chloride or isophthaloyl chloride may be employed.

The copolyester-carbonates of the present invention can be prepared by known processes such as interfacial polymerization or phase boundary separation, transesterification, solution polymerization, melt polymerization, interesterification, and the like. Various prior art polymerization processes are disclosed in U.S. Pat. Nos. 3,030,331; 3,169,121; 3,207,814 and 4,188,314, all of which are hereby incorporated herein by reference. Although the processes may vary, several of the preferred processes typically include dissolving or dispersing the reactants in a suitable water immiscible solvent medium and contacting the reactants with a carbonate precursor, such as phosgene, in the presence of a suitable catalyst and an aqueous caustic solution under controlled pH conditions. A molecular weight regulator, that is a chain stopper, is generally added to the reactants prior to or during contacting them with a carbonate precursor. Useful molecular weight regulators include, but are not limited to, monohydric phenols, such as phenol, chroman-1, paratertiarybutylphenol, and the like. Techniques for the control of molecular weight are well known in the art and may be used in the present process for controlling the molecular weight of the copolyester-carbonate resins. The most commonly used water immiscible solvents include methylene chloride, 1,2-dichloroethane, chlorobenzene, toluene and the like.

The acid acceptor employed can be either an organic or an inorganic base. A suitable organic acid acceptor, for example, is a tertiary amine and includes such materials as pyridine, triethylamine, dimethylaniline, tributylamine, and the like. The inorganic acid acceptor can be a hydroxide, such as the alkali or alkaline earth metal hydroxides, a carbonate, a bicarbonate, or a phosphate.

The catalysts, which can be employed if the interfacial polymerization technique is used, accelerate the rate of polymerization of the dihydric phenol of Formula I and the thiodiphenol of Formula III, with the ester precursor such as the diacid dihalide or the difunctional carboxylic acid, and with the carbonate precursor such as phosgene. Suitable catalysts include, but are not limited to, tertiary amines, secondary amines, quaternary phosphonium and ammonium compounds, amidines, and the like.

Also included herein are the randomly branched copolyester-carbonates wherein a minor amount (typically between 0.05 and 2.0 mol percent, based on the quantity of dihydric phenol and thiodiphenol used) of a polyfunctional aromatic compound is a co-reactant with the dihydric phenol of Formula I and the thiodiphenol of Formula III in the reaction mixture, comprising also the carbonate precursor and the ester precursor, to provide a thermoplastic randomly branched copolyestercarbonate. These polyfunctional aromatic compounds contain at least three functional groups which may be hydroxyl, carboxyl, carboxylic anhydride, haloformyl, or mixtures thereof. Some illustrative non-limiting examples of these polyfunctional compounds include trimellitic anhydride, trimellitic acid, trimellityl trichloride, 4-chloroformyl phthalic anhydride, pyromellitic acid, pyromellitic dianhydride, mellitic acid, mellitic anhydride, trimesic acid, benzophenonetetracarboxylic acid, benzophenonetetracarboxylic acid anhydride, and the like. Other organic polyfunctional compounds useful in making these randomly branched copolyester-carbonates are disclosed in U.S. Pat. Nos. 3,635,895 and 4,001,184, both of which are hereby incorporated herein by reference.

When a dicarboxylic acid or its reactive derivative is used as the ester precursor in the instant invention the copolyester-carbonates will generally contain repeating units represented by the structures

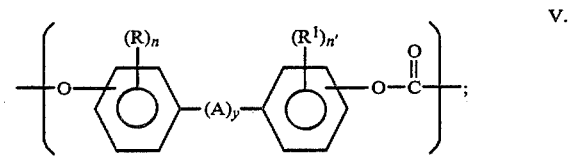

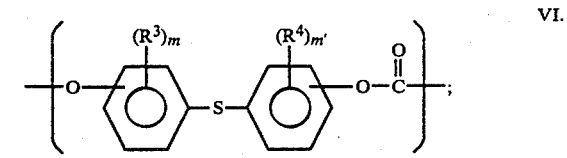

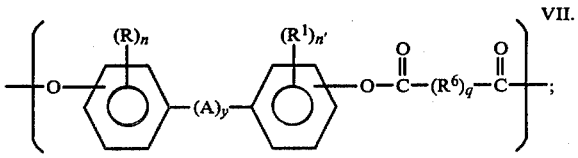

and

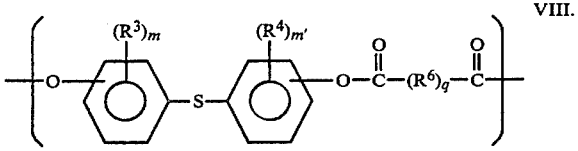

wherein R, $R^1$, $R^3$, $R^4$, $R^6$, A, n, n', m, m' and y are as defined above.

The structural units of Formulae VI and VIII will be present in relatively minor amounts. The amount of structural units of Formulae VI and VIII present will be an amount which when said copolyester-carbonate resin is admixed with the fluorinated polyolefin is effective to render said compositions flame retardant and non-dripping. This amount is generally in the range of from about 1 to about 15 mole percent, based on the total amount of structural units of Formulae V-VIII present, and preferably from about 1 to about 10 mole percent.

Generally, if the instant compositions contain less than about 1 mole percent of the structural units of Formulae VI and VIII there will be no appreciable improvement in the flame retardancy of the compositions. If, on the other hand, the compositions contain more than about 15 mole percent of the structural units of Formulae VI and VIII, the compositions will begin to be economically adversely affected vis-a-vis compositions not containing structural units of Formulae VI and VIII. This is due to the fact that the thiodiphenols used to make these structural units VI and VIII are relatively more expensive than the dihydric phenols used in the production of structural units of Formulae V and VII. Also, the concentration of sulfur in these compositions will begin to render these compositions unsuitable for applications where the presence of large or substantial amounts of sulfur is undesirable, or where copolyester-carbonates exhibiting the characteristics of halogen free and substantially sulfur free copolyester-carbonates, such as those based on bisphenol-A, are required.

Copolyester-carbonates containing from 1 to about 15 mole % of structural units of Formulae VI and VIII are obtained by utilizing from 1 to about 15 mole % of the thiodiphenol of Formula III, based on the total amount of the dihydric phenol of Formula I and the thiodiphenol of Formula III employed, in the production of the copolyester-carbonate resins.

The high molecular weight aromatic copolyester-carbonate resins of this invention generally have a weight average molecular weight in the range of from about 5,000 to about 200,000, preferably from about 10,000 to about 100,000, and more preferably from about 25,000 to about 50,000.

The copolyester-carbonate compositions of this invention may optionally contain certain commonly known and used additives such as, for example, antioxidants; antistatic agents; mold release agents; inert fillers; colorants; ultraviolet radiation absorbers such as the benzophenones, benzotriazoles, benzylidene malonates, and the like; hydrolytic stabilizers such as the epoxides disclosed in U.S. Pat. Nos. 3,489,716; 4,138,379 and 3,839,247, all of which are hereby incorporated herein by reference; color stabilizers such as the organophosphites disclosed in U.S. Pat. Nos. 3,305,520 and 4,118,370, both of which are hereby incorporated herein by reference; and the like.

Another embodiment of the instant invention is a composition containing (i) a minor amount of a fluorinated polyolefin, (ii) at least one copolyester-carbonate resin derived from a halogen-free and sulfur-free non-polycyclic dihydric phenol, such as that represented by Formula I, and (iii) at least one copolyester-carbonate resin derived from (a) at least one halogen-free and sulfur-free non-polycyclic dihydric phenol of Formula I and (b) at least one halogen-free thiodiphenol of Formula III.

These compositions thus contain blends of two or more copolyester-carbonate resins, one of these resins being the coreaction product of (a) a carbonate precursor, (b) at least one halogen-free and sulfur-free non-polycyclic dihydric phenol of Formula I, (c) at least one halogen-free thiodiphenol of Formula III, and (d) at least one difunctional carboxylic acid or a reactive derivative thereof, hereinafter referred to as halogen-free and sulfur containing copolyester-carbonate resin A. The other copolyester-carbonate resin present in these blends is one based on the coreaction products of (a) a carbonate precursor, (b) at least one halogen-free, sulfur-free, and non-polycyclic dihydric phenol of Formula I, and (c) at least one difunctional carboxylic acid or a reactive derivative thereof, hereinafter referred to as halogen-free and sulfur-free copolyester-carbonate resin B.

When the compositions contain blends of resins A and B, the amount of structural units of Formulae VI and VIII present in resin A may be increased above the 15 mole percent limit specified hereinafore, providing that the amount of structural units of Formulae VI and VIII present in the final blends is in the range of from about 1 to about 15 mole %, and preferably from about 1 to about 10 mole % based on the total amount of structural units V–VIII present in resins A and B.

Thus, for example, resin A may contain 30 mole % of structural units VI and VIII. This resin is then blended with resin B which contains only structural units of Formulae V and VII. The final blend contains amounts of resin A and resin B such that the mole % of structural units of Formulae VI and VIII present in the blend, based on the total amount of structural units of Formulae V–VIII present in resin A and structural units of Formulae V and VII present in resin B, is in the range of from about 1 to about 15 mole %. Thus a 1:1 molar ratio of resin A (which contains 30% of structural units of Formulae VI and VIII) to resin B would result in a blend containing 15 mole % of structural units of Formulae VI and VIII.

Generally, these blends contain from about 20 to about 80 mole percent of resin A and about 80 to about 20 mole percent of resin B.

These blends may also contain the various aforedescribed additives.

The amount of fluorinated polyolefin present in these blends is from about 0.01 to about 1 weight percent, and preferably from about 0.01 to about 0.5 weight percent.

PREFERRED EMBODIMENT OF THE INVENTION

The following examples are presented to more full and clearly illustrate the invention. They are presented by way of illustration and not of limitation. In the examples all parts and percentages are by weight unless otherwise specified.

The following examples illustrate copolyester-carbonate compositions falling outside the scope of the instant invention. They are presented for comparative purposes only.

EXAMPLE 1

This example illustrates a prior art copolyester-carbonate resin which contains no thiodiphenol residues and to which no fluorinated polyolefin has been added.

Into a mixture of 2263 grams of bisphenol-A, 31.1 grams of phenol, 6 liters of water, 20.1 grams of triethylamine, and 7 liters of methylene chloride, brought to a pH of 11 by the addition of 25% aqueous sodium hydroxide, are slowly added 406 grams of isophthaloyl dichloride dissolved in 1 liter of methylene chloride. After addition of the acid chloride has ceased, the mixture is stirred for 5 minutes and the pH is stabilized at about 11. Phosgene is then introduced into this mixture at the rate of 30 grams/minute for a period of 24 minutes. After phosgenation has ceased the two layers are separated, and the methylene chloride layer is washed with 0.01N HCl followed by two washings with deionized water. The polymer is precipitated with steam and dried at 95° C. The intrinsic viscosity of the resultant polymer, determined at 25° C. in methylene chloride, is 0.53 dl/gm.

The resin is then fed to an extruder operating at about 600° F. and the extrudate is comminuted into pellets. The pellets are then injection molded at about 620° F. into test bars measuring about 2½"×½"×⅛" thick. These test bars are subjected to the test procedure set forth in underwriters' Laboratories, Inc. Bulletin UL-94, Burning Test for Classified Materials. In accordance with this test procedure, materials that pass are rated V-O, V-I or V-II based on the results of 5 specimens. The criteria for each V (for vertical) rating per UL-94 is briefly as follows:

"V-O": Average flaming and/or glowing after removal of the igniting flame shall not exceed 5 seconds and none of the specimens shall drip flaming particles which ignite absorbent cotton.

"V-I": Average flaming and/or glowing after removal of igniting flame shall not exceed 25 seconds and the glowing does not travel vertically for more than ⅛" of the specimen after flaming ceases and glowing is incapable of igniting absorbent cotton.

"V-II": Average flaming and/or glowing after removal of the igniting flame shall not exceed 25 seconds and the specimens drip flaming particles which ignite absorbent cotton.

In addition, a test bar which continues to burn for more than 25 seconds after removal of the igniting flame is classified, not by UL-94, but by standards of the invention, as "burns". Further, UL-94 requires that all test bars in each test group must meet the V-type rating to achieve the particulat classification. Otherwise, the 5 test bars receive the rating of the worst single bar. For example, if one bar is classified as V-II and the other four are classified as V-O, then the rating for all 5 bars is V-II.

The results of this test are set forth in Table I.

EXAMPLE 2

This example illustrates a copolyester-carbonate composition falling outside the scope of the instant invention in that the composition contains a fluorinated polyolefin but the copolyester-carbonate resin does not contain any thiodiphenol residues.

To 1470 grams of a copolyester-carbonate resin powder prepared substantially in accordance with the procedure of Example 1 are added 30 grams of TEFLON type 6. The resultant mixture is thoroughly mixed and is then formed into test bars in accordance with the procedure of Example 1.

These test bars are subjected to test procedure UL-94 and the results are set forth in Table 1.

The following Example illustrates a copolyester-carbonate composition falling within the scope of the instant invention, i.e. one which contains both the minor amounts of the fluorinated polyolefin and wherein the copolyester-carbonate resin contains the minor amounts of thiodiphenol residues.

EXAMPLE 3

A copolyester-carbonate resin containing thiodiphenol residues is prepared substantially in accordance with the procedure of Example 1 except that the 2263 grams of bisphenol-A utilized in Example 1 are replaced with 1826.4 grams of bisphenol-A and 436.6 grams of 4,4'-thiodiphenol. The resultant copolyester-carbonate has an intrinsic viscosity at 25° C. in methylene chloride of 0.507 dl./gm.

To 650 grams of this sulfur containing copolyester-carbonate, in powder form, are added 850 grams of a sulfur free copolyester-carbonate resin prepared substantially in accordance to the procedure of Example 1. This resultant blend contains about 8.6 mole percent of the thiodiphenol residue, i.e., structural units of Formulae VI and VIII. To this powdered blend are added 1.5 grams of TEFLON type 6. The resulting mixture is thoroughly mixed and formed into test bars substantially in accordance with the procedure of Example 1.

The test bars are subjected to test procedure UL-94 and the results are set forth in Table I.

TABLE I

| Example No. | Mole % Thiodiphenol | Weight % TEFLON | UL-94 |
|---|---|---|---|
| 1 | 0 | 0 | Burns |
| 2 | 0 | 2 | Burns |
| 3 | 8.6 | 0.1 | V-O |

As illustrated by the data in Table I the instant compositions are flame retardant and non-dripping. The flame retardant and non-dripping properties of these compositions are achieved using relatively small amounts of fluorinated polyolefin and relatively low concentrations of thiodiphenol. Thus, the instant copolyester-carbonate resin compositions match quite closely the properties of sulfur-free copolyester-carbonate resins while simultaneously exhibiting flame retardancy and non-dripping properties.

As illustrated by the data for Example 2 the presence of relatively large amounts of fluorinated polyolefin in a composition containing a sulfur-free copolyester-carbonate resin does nothing to improve the flame retardancy thereof. However, as shown by the data for Example 3, the combination of relatively small amounts of fluorinated polyolefin together with the presence of relatively minor concentrations of thiodiphenol residues in the copolyester-carbonate polymer is very effective in rendering the resultant copolyester-carbonate compositions flame retardant.

It will thus be seen that the objects set forth above, among those made apparent from the preceding description, are efficiently attained, and since certain changes may be made in carrying out the above processes and in the compositions set forth without departing from the scope of this invention, it is intended that all matters contained in the above description shall be interperted as illustrative and not in a limiting sense.

What is claimed is:

1. Fire retardant and substantially non-dripping copolyester-carbonate compositions consisting essentially of, in admixture
    (i) at least one halogen-free sulfur containing copolyester-carbonate resin comprised of the reaction products of (a) a carbonate precursor, (b) at least one halogen-free, sulfur-free and non polycyclic dihydric phenol, and (c) from about 1 to about 15 mole percent, based on the total amounts of said dihydric phenol and the thiodiphenol used, of at least one halogen-free thiodiphenol, and (d) at least one difunctional carboxylic acid or a reactive derivative thereof; and
    (ii) from about 0.01 to about 1 weight percent, based on the amount of said copolyester-carbonate resin, of at least one fluorinated polyolefin.

2. The compositions of claim 1 wherein said amount of said fluorinated polyolefin is from about 0.01 to about 0.5 weight percent.

3. The compositions of claim 1 wherein said amount of said halogen-free thiodiphenol is in the range of from about 1 to about 10 mole percent.

4. The compositions of claim 1 wherein said halogen-free, sulfur-free and non-polycyclic dihydric phenol is represented by the general formula

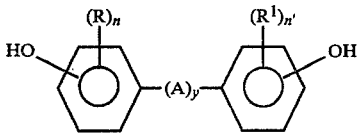

wherein:

R is independently selected from monovalent hydrocarbon radicals;

R¹ is independently selected from monovalent hydrocarbon radicals;

A is selected from divalent non polycyclic hydrocarbon radicals, the —O— radical, and the

radical;

n and n' are independently selected from whole numbers having a value of from 0 to 4 inclusive; and y is one or zero.

5. The compositions of claim 4 wherein said monovalent hydrocarbon radicals are selected from alkyl radicals, aryl radicals, aralkyl radicals, and alkaryl radicals.

6. The compositions of claim 5 wherein said monovalent hydrocarbon radicals are selected from alkyl radicals.

7. The compositions of claim 6 wherein said divalent hydrocarbon radicals are selected from alkylene radical, alkylidene radicals, monocycloalkylene radicals, and monocycloalkylidene radicals.

8. The compositions of claim 6 wherein said halogen-free thiodiphenol is represented by the general formula

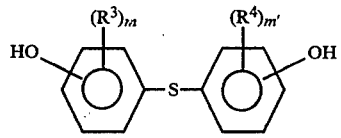

wherein:

R³ is independently selected from monovalent hydrocarbon radicals;

R⁴ is independently selected from monovalent hydrocarbon radicals; and m and m' are independently selected from whole numbers having a value of from 0 to 4 inclusive.

9. The compositions of claim 8 wherein said monovalent hydrocarbon radicals are selected from alkyl radicals, aryl radicals, aralkyl radicals, and alkaryl radicals.

10. The compositions of claim 9 wherein said monovalent hydrocarbon radicals are selected from alkyl radicals.

11. The compositions of claim 10 wherein said thiodiphenol is a 4,4'-thiodiphenol.

12. The compositions of claim 8 wherein said difunctional carboxylic acid is selected from isophthalic acid, terephthalic acid, and mixtures thereof.

13. The compositions of claim 8 wherein said reactive derivative of said difunctional carboxylic acid is selected from isophthaloyl dichloride, terephthaloyl dichloride, and mixtures thereof.

14. The compositions of claim 13 wherein said carbonate precursor is phosgene.

15. The compositions of claim 14 wherein said dihydric phenol is bisphenol-A.

16. The compositions of claim 15 wherein said thiodiphenol is 4,4'-thiodiphenol.

17. The compositions of claim 1 which further contain (iii) at least one halogen-free and sulfur-free copolyester-carbonate resin derived from (a) a carbonate precursor, (b) at least one halogen-free, sulfur-free and non polycyclic dihydric phenol, and (c) at least one difunctional carboxylic acid or a reactive derivative thereof.

18. The compositions of claim 17 wherein the amount of said thiodiphenol is an amount effective to render said compositions flame retardant.

19. The compositions of claim 18 wherein said amount is in the range of from about 1 to about 15 mole percent, based on the total amount of thiodiphenol and dihydric phenol.

* * * * *